UNITED STATES PATENT OFFICE.

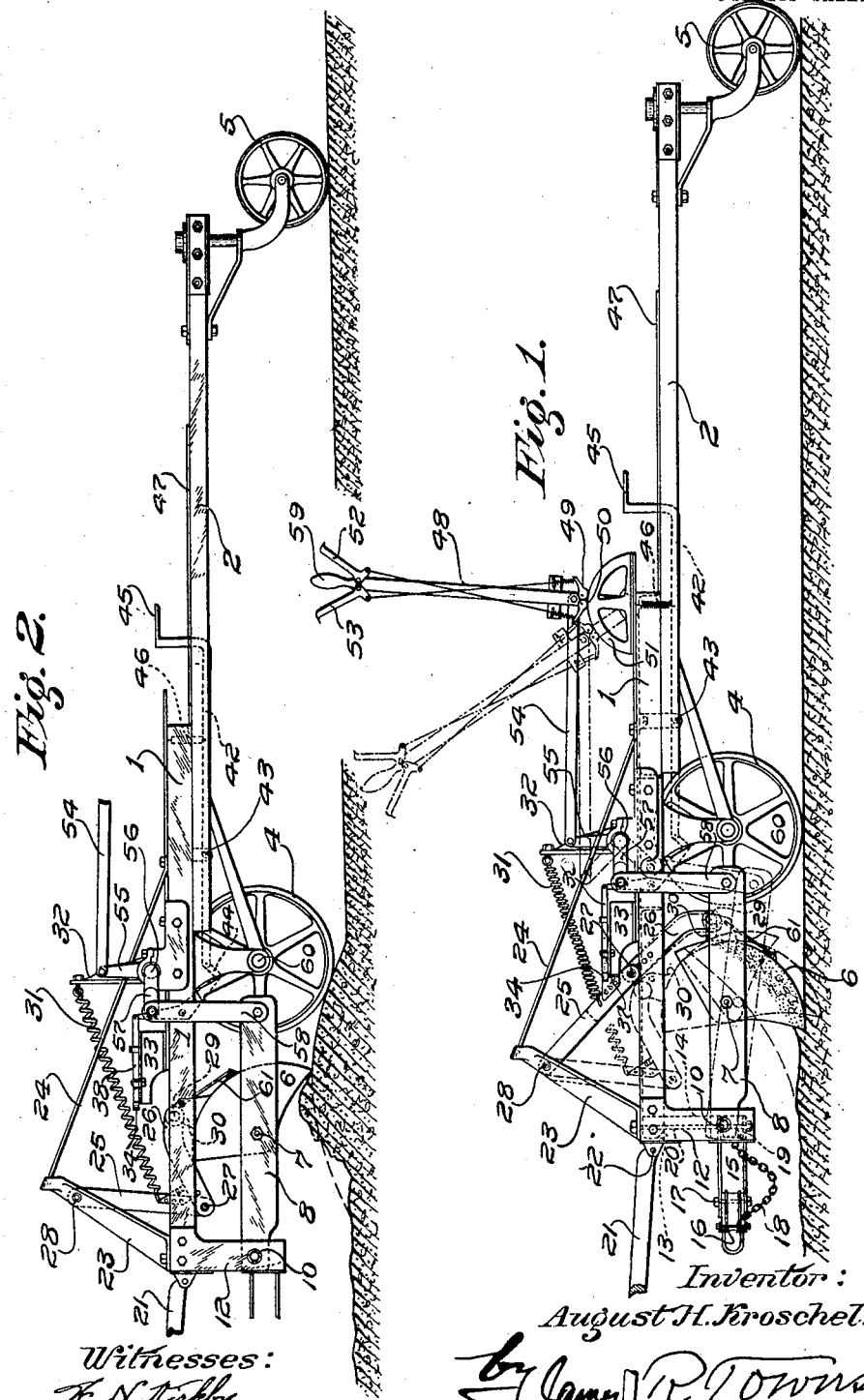

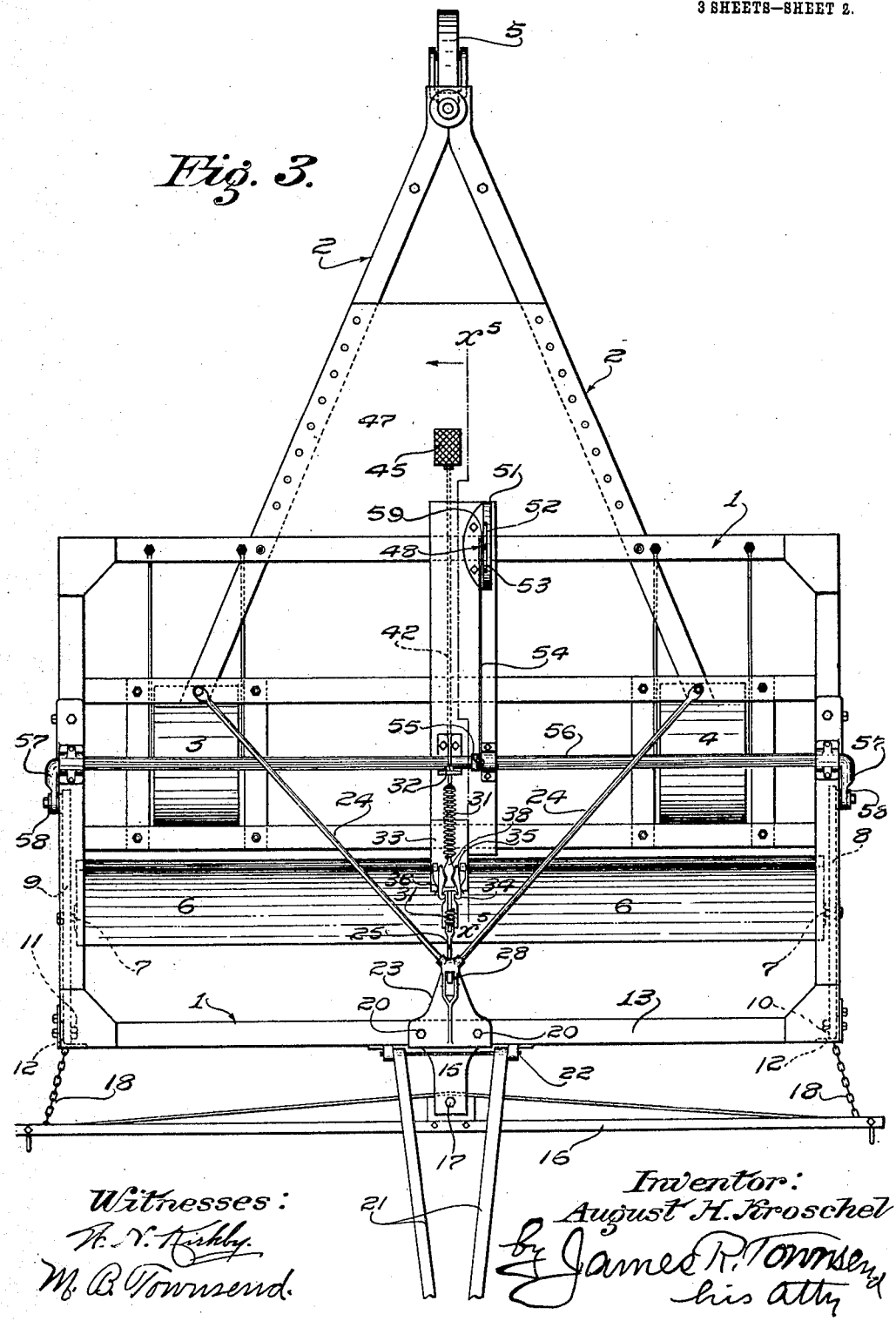

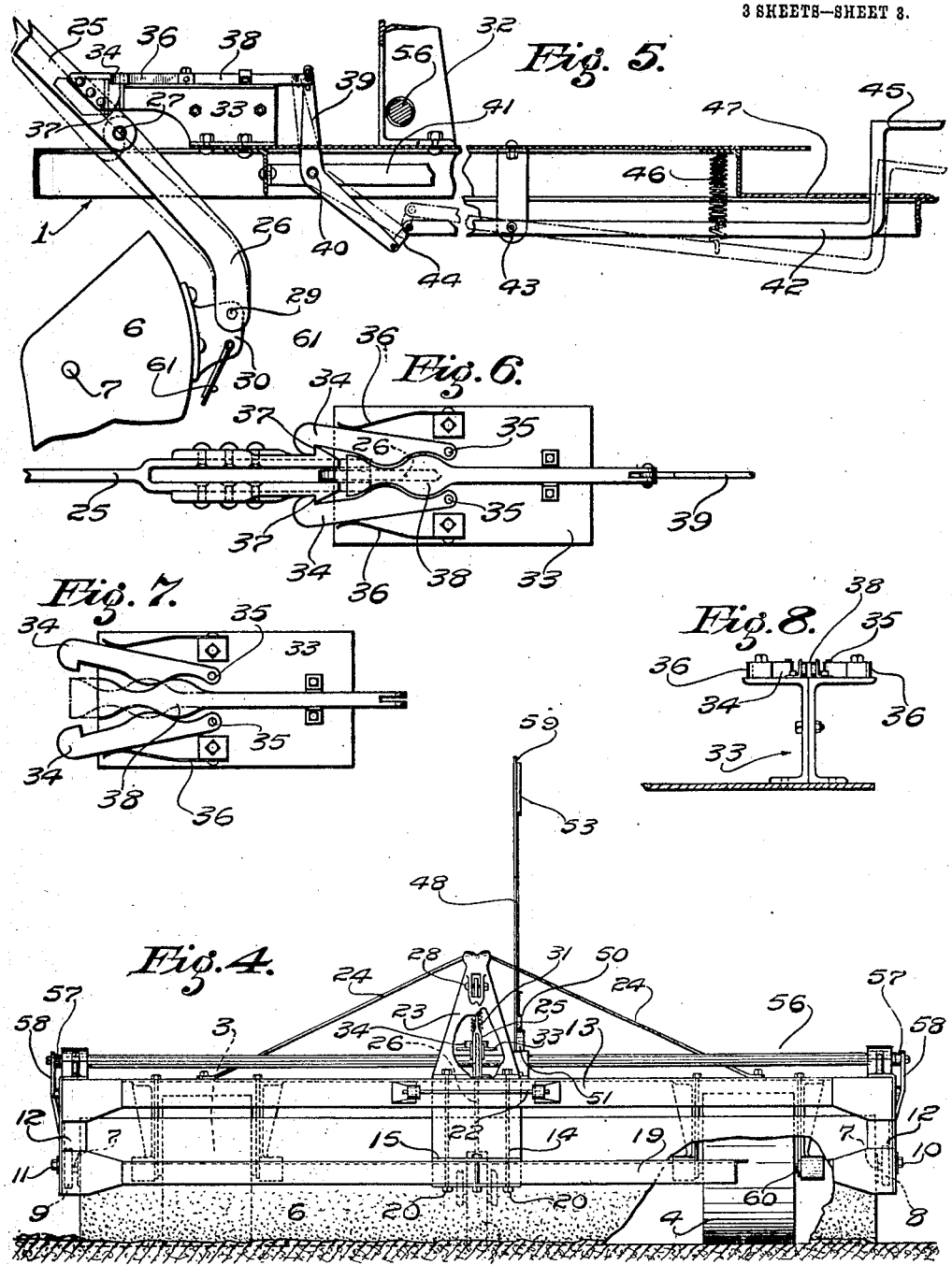

AUGUST H. KROSCHEL, OF LOS ANGELES, CALIFORNIA, ASSIGNOR OF ONE-HALF TO FRIEDRICH EICHENHOFER AND ONE-HALF TO N. A. ROSS, OF LOS ANGELES, CALIFORNIA.

COMBINED GRADING AND BORDERING MACHINE.

No. 871,709.  Specification of Letters Patent.  Patented Nov. 19, 1907.

Application filed February 14, 1907. Serial No. 357,398.

*To all whom it may concern:*

Be it known that I, AUGUST H. KROSCHEL, a citizen of the United States, residing at Los Angeles, in the county of Los Angeles and State of California, have invented a new and useful Combined Grading and Bordering Machine, of which the following is a specification.

This invention relates to a machine for operating on the surface of the ground, and is adapted for producing a smooth surface, for leveling, and for producing, when required, ridges of any form of cross section desired.

An object of the invention is to so construct the machine as to enable the attendant to adjust the same to cut the earth to a determined depth, and to carry the earth thus loosened to any appropriate place and there dump it at the will of the operator, in a smooth and regular form to produce a ridge.

Another object is to provide means for setting the machine for different kinds of work, so that in some instances the machine may be used simply for leveling or smoothing the ground, and in other instances may be used both for smoothing and for forming borders.

This invention is especially applicable for use in preparing ground for irrigation where it is desirable to provide basins having perfectly level floors and surrounded by borders in the form of ridges over which vehicles and farm implements such as mowing machines, cultivators, and the like, may readily pass.

Another object is to provide means whereby the attendant may have perfect control of the machine both as to leveling and as to dumping.

Other objects are simplicity, ease of operation, strength and durability.

By means of this machine the attendant may accomplish at one operation what has heretofore required two or more operations, and the work is more satisfactorily done, leaving the ground in perfect condition.

The accompanying drawings illustrate the invention.

Figure 1 is a side elevation of a grading and bordering machine embodying this invention as it appears in the operation of leveling. Dotted lines indicate other positions into which the scraper may be brought relative to the frame, and also indicate the position of the scraper-operating hand lever when said scraper is deeply inserted into the ground. Fig. 2 is a fragmental elevation of the machine in the operation of forming a border at the margin of a leveled space. Fig. 3 is a fragmental plan of the machine with parts in position shown in Fig. 1. Fig. 4 is a broken front elevation of the machine as shown in Figs. 1 and 3, omitting the double tree and tongue. Parts of the scraper and truss bracket of the frame are broken away to expose the leveled surface and parts that would otherwise be concealed. Fig. 5 is a fragmental, sectional detail of the tripping mechanism for releasing the scraper to allow the same to revolve and dump. $x^5$, Fig. 3 indicates the line of section. Fig. 6 is a fragmental detail plan of the scraper locking and releasing means with parts in position for holding the scraper against revolving or dumping. Fig. 7 is a view of the lock with parts in position for releasing the scraper to allow it to revolve. Fig. 8 is a rear elevation of the locking means viewed from the right of Fig. 7.

The frame comprises a rectangular portion 1 and a rearwardly tapering triangular portion 2 supported by wheels 3, 4, and by swivel-wheel 5.

6 is a scraper pivotally mounted at 7 to levers 8, 9, that are in turn pivoted at 10, 11, to corner posts 12 fastened to the front bar 13 of the frame that is arranged in front of the carrying means 3, 4, and to which bar 13 a central block 14 is connected to afford rigid attachment for the drawbar 15 to which the double-tree 16 is pivoted by clevis-pin 17.

18 designates stay chains for the double-tree connecting the ends thereof to the posts 12.

19 is a lower front bar formed of angle iron connected with bar 13 by the posts 12 and the block 14.

20 designates bolts through the drawbar 15, the lower front bar 19, block 14, front bar 13, and base of standard 23, to give rigidity and strength to the middle of the frame.

21 is a tongue pivoted at 22 to the middle of the front bar 13 of the frame.

A forwardly projecting support is fastened to the frame in front of the forward carrying means 3, 4. Said support may be in the form of a standard 23 and stays 24.

25, 26 designate two links jointed together at 27, the link 25 being pivoted at 28 to the standard 23, and the link 26 being pivotally connected at 29 with scraper 6 through the medium of an arm 30 thereon which is fastened to the upper rear portion of the scraper.

31 is a spring connecting the upper link 25 with a support 32 fastened to the frame and tending to normally hold the links 25, 26 retracted so that the joint 27 is rearward of a line drawn between the pivotal points 28 and 29 at the opposite ends of the links.

33 is a stop on the frame to prevent the links 25, 26 from collapsing rearwardly after the joint 27 has passed the dead center between the pivotal points 28 and 29. When the links 25 and 26 are thus held against rearward collapsing they form a positive brace to prevent the revolution of the scraper which is of a semicylindrical form. Locking means are provided to positively hold the links 25, 26 in rigid position to resist the thrust of the scraper when in operation, as shown in Fig. 1. Said locking means are detailed in Figs. 5, 6, 7 and 8.

34 designates dogs pivoted at 35 to the stop 33 and spring-pressed by springs 36 to engage detents 37 fixed to the brace formed of the links 25, 26. The detents and dogs are beveled so that whenever the links are thrown into their bracing position shown in Figs. 1 and 5, the detents will enter between the dogs and will be thereby positively locked against withdrawal, thereby holding the toggle-joint formed by links 25, 26 in its brace-forming position.

38 designates a releasing head between the dogs 34 to spread them apart, thereby to release the same from the detents 37, and adapted to slide on forward to engage the ends of said detents, thereby to force the joint 27 forward beyond the dead center, thereby to break the toggle joint and allow the scraper to partially revolve, as indicated in dotted lines in Fig. 1, and in full lines in Fig. 2, for the purpose of dumping any load that the scraper may have accumulated.

39 designates a lever pivoted at 40 to the stays 41 which form a part of the frame 1. Said lever is operable by a foot-lever 42 pivoted to the frame at 43, and is connected by a link 44 with lever 39, so that downward pressure on the foot-piece 45 of the foot-lever will force the releasing head 38 forward to release dogs 34 and break the toggle joint 25, 26, 27. Said foot-lever 42 is normally held by a spring 46 in position to retract the releasing head 38 to a point that will allow the dogs 34 to engage the detents 37 when the toggle joint is again brought into the bracing position.

47 is a platform on the rearward extension 2 of the frame, on which platform the operator will stand to control the apparatus. The foot-piece 45 projects above said platform, and the scraper-controlling lever 48 is pivoted to the frame and projects upward therefrom in front of said platform 47 and foot-piece 45, so that the operator may have ready control of the same. Said lever is locked by keepers 50 and 49 engaging the arc 51 and controlled by rear and front handles 52 and 53. Said lever 48 is connected by a link 54 with arm 55 of rock-shaft 56 having arms 57 which are connected by links 58 with levers 8, 9, to which scraper 6 is pivoted. By this arrangement the scraper may be raised by moving the handle 59 of the lever 48 backward, and may be lowered by moving the handle of said lever forward. The change of position of the scraper by such manipulation of the lever 48 will depend upon whether or no the brace 25, 26 is in or out of locked position. If said brace is in locked position as indicated in solid lines in Fig. 1, the depression of the levers 8 and 9 by the forward movement of the lever 48 will serve to depress the cutting edge of the scraper, at the same time drawing said cutting edge further to the rear, as indicated by the lowermost dotted lines in Fig. 1. The position shown in said dotted lines is an extreme position into which the scraper will only be thrown when it is desired to excavate, as in digging ditches. A reverse movement of the handle 59 will lift the scraper, at the same time throwing the cutting edge thereof forward.

The supporting means 3, 4, 5 are all arranged rearwardly of, and in the path of, the scraper, thus to travel on the ground over which the scraper has passed. The spring 31 normally holds the toggle joint in its braced position, indicated in Fig. 1, where it is locked by the locking mechanism shown in Figs. 5, 6, 7 and 8.

The front supporting wheels 3 and 4 are preferably broad-faced wheels. I have satisfactorily used wheels the faces of which were 18 inches across, the purpose of this being to prevent the wheels from sinking into soft earth. In the machine which I have used, the space between the front and rear supporting wheels is 9 feet, and the frame projects in front of the axles 60 for a distance of about 3 feet 6 inches, the length of the scraper-supporting levers being about 3 feet, the scraper being pivoted about midway of such levers. The scraper used was about 12 feet long, this being a desirable width for a machine of the proportions stated.

The scraper is preferably constructed of sheet metal of as light weight as will properly serve the purpose, the same being strengthened by a truss-rod 61 passing through the arm 30 to which the link 26 of the toggle-joint is pivoted.

It is to be understood that the invention is not limited to any specific size or dimensions, but the size and dimensions above given are satisfactory for one team of eight horses to handle in ordinary work.

In practical operation the operator will stand upon the platform 47 with the handle 59 in hand and the foot-piece 45 accessible to his foot, and as the machine advances he will manipulate the lever 48 to bring the cutting edge of the scraper to a depth he may deem appropriate to reach the desired level. This will be done by pushing forward the handle to lower the cutting edge of the scraper slightly below the level of the bottoms of the supporting wheels 3, 4, 5. When the machine has advanced far enough to bring the trailer or swivel-wheel 5 onto the ground which has been smoothed by the scraper, he will then bring the handle to upright position indicated in solid lines in Fig. 1, which is the position that brings the cutting edge of the scraper into a plane common to the bottoms of the three supporting wheels, and thereupon the lever may be locked by its keepers 49, 50. The operator may use his judgment as to the depth to be cut, gaging the same so that when the scraper has proceeded to the line at which the border is required the load accumulated in the scraper will be ready to be dumped.

It is evident that in preparing for irrigation ground that has considerable slope, borders will be required between the basins at more frequent intervals than will be necessary on ground that lies approximately level. In making the basins small with deep borders the scraper will require to be set deeper than in making large basins.

When the appropriate place for dumping the scraper has been reached the operator will depress the foot-piece 45, thus forcing forward the releasing head 38, thereby spreading the dogs 34, releasing the detents 37, and breaking the toggle-joint, whereupon the stress on the cutting edge of the scraper will cause the scraper to revolve into the dumping position indicated in Fig. 2. By dumping in this manner the contents of the scraper will be deposited in the form of a ridge which will be smoothed over by the cutting edge of the scraper as the machine advances, thus giving the ridge a cross-sectional shape substantially indicated in Fig. 2 by solid and dotted lines.

If it is desired to dump more slowly, thus to spread out the contents of the scraper over a larger space, the operator may, without releasing the locking device, pull the handle 59 back, thus to bring the scraper into a position above the ground, whereupon the earth contained in the scraper will slide out more or less gradually until the scraper is emptied. The further back the handle 59 is drawn, the steeper will be the inclination of the curved bottom of the scraper, thus causing accumulations therein to fall out more rapidly than when the scraper is less elevated.

In case the dumping is accomplished by releasing the scraper, as indicated in solid lines in Fig. 2, the spring 31 will be extended by the toggle-joint as it bends into the dumping position, and as soon as the scraper again becomes free, the spring 31 contracting, brings the toggle-joint back into its bracing position where it is held as before.

The frame of the apparatus is of considerable weight, being preferably made of angle iron, and the rear extension 2 is of such weight as to overbalance the portion of the frame and its adjuncts in front of the front wheels 3, 4; thus to always hold the trailer-wheel 5 at all times on the ground, avoiding any possible tilting of the frame under the stress of the draft.

The tongue 21 and double-tree 16 are connected to the middle of the front bars, and the trailer 5 is in line directly behind the same, at the apex of the triangular frame 2. The tongue 21 serves to turn the machine around at the end of the field, or wherever desired.

What I claim is:—

1. A leveling machine comprising a frame, carrying means for the frame, a scraper mounted to revolve on a horizontal axis and carried by the frame in front of the carrying means, and means for operating the scraper.

2. A leveling machine comprising a frame, carrying means for the frame, a scraper mounted to revolve on a horizontal axis and carried by the frame in front of the carrying means, and means for raising and lowering the scraper relative to the frame.

3. A frame, three supports therefor, a scraper pivotally connected to the frame in front of the supports, locking means for holding the scraper in scraping position, and means for raising and lowering the scraper while said locking means are locked.

4. A frame, supporting means for said frame, a scraper pivotally connected to said frame in front of the supporting means, automatic means for holding the scraper in scraping position, and means for raising and lowering the scraper.

5. A frame, supporting means for the frame, levers pivoted to the frame in front of said supporting means, a scraper pivoted to said levers to revolve on a horizontal axis, means for locking the scraper in scraping position, and means for raising and lowering said levers.

6. A frame, supporting means for said frame, a rock shaft on said frame, a lever for operating said rock shaft, levers pivoted to the frame and connected with said rock shaft, a scraper pivoted to said levers, spring-operated means for bringing said scraper to scraping position, and locking means for holding said scraper in scraping position.

7. A frame, supporting means for said frame, a platform on said frame, a scraper adjustably and pivotally connected with said frame, automatic means for holding the scraper in scraping position, means for releasing the scraper from such position, and means for raising and lowering the scraper, said releasing and raising and lowering means being operable from said platform.

8. A frame, supporting means therefor, rearwardly-extending levers pivoted to the frame in front of said supporting means, a scraper pivoted to said levers, a toggle joint connection between the scraper and the frame to brace said scraper in scraping position, and a spring to bring the toggle-joint into bracing position.

9. A frame, supporting means therefor, rearwardly-extending levers pivoted to the frame in front of said supporting means, a scraper pivoted to said levers, a toggle-joint connection between the scraper and the frame to brace said scraper in scraping position, a spring to bring the toggle-joint into bracing position, means to lock said toggle-joint in such position, and means to release and break the toggle-joint from its bracing position.

10. A frame, two front wheels and a rear wheel supporting said frame, the frame extending in front of said front wheels and there provided with a standard, levers connected with the frame in front of the front wheels, a scraper pivoted to said levers, a rock shaft connected with said levers to raise and lower the same, a toggle-joint connection between the scraper and the standard, a spring to draw the toggle-joint back of the dead center to form a brace for the scraper, means for holding the toggle-joint in bracing position, means for releasing the toggle-joint holding means, and means for rocking the rock shaft.

11. The combination with a frame, of a scraper pivotally connected thereto, a toggle-joint connection between the frame and the scraper, a stop to stop said toggle-joint in a breaking position, means for locking said toggle-joint in such position, and means for releasing said locking means.

12. A frame, supporting means therefor, a scraper pivotally connected with the frame, a toggle-joint connection between the scraper and the frame, a stop for said toggle joint, detents on said toggle-joint, dogs to engage said detents to hold said toggle-joint against said stop, and a head to spread said dogs apart to release the detents.

13. A frame, supporting means therefor, a scraper pivotally connected with the frame, a toggle-joint connection between the scraper and the frame, a stop for said toggle-joint, detents on said toggle-joint, dogs to engage said detents to hold said toggle-joint against said stop, a head to spread said dogs apart to release the detents, and a foot lever connected to operate said head.

14. The combination with the scraper bracing toggle-joint, of detents thereon, dogs to engage said detents, and a releaser head arranged to spread said dogs apart.

In testimony whereof, I have hereunto set my hand at Los Angeles California this 23rd day of January 1907.

AUGUST H. KROSCHEL.

In presence of—
JAMES R. TOWNSEND,
JULIA TOWNSEND.